(12) United States Patent
Teramoto et al.

(10) Patent No.: US 8,826,765 B2
(45) Date of Patent: Sep. 9, 2014

(54) HELICAL GEAR AND POWER TRANSMISSION APPARATUS

(75) Inventors: Takayuki Teramoto, Nisshin (JP); Kazuhiko Murakoshi, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 37 days.

(21) Appl. No.: 13/499,181

(22) PCT Filed: Sep. 14, 2011

(86) PCT No.: PCT/JP2011/070929
§ 371 (c)(1),
(2), (4) Date: Mar. 29, 2012

(87) PCT Pub. No.: WO2013/038513
PCT Pub. Date: Mar. 21, 2013

(65) Prior Publication Data
US 2013/0061703 A1   Mar. 14, 2013

(51) Int. Cl.
*F16H 55/17* (2006.01)
*F16H 55/14* (2006.01)
*B60K 1/02* (2006.01)

(52) U.S. Cl.
CPC ............ *F16H 55/14* (2013.01); *F16H 55/17* (2013.01); *B60K 1/02* (2013.01)
USPC .............................................. 74/434; 74/437

(58) Field of Classification Search
CPC ......... F16H 1/00; F16H 7/00; F16H 2049/00; F16H 2035/00; F16H 2019/00
USPC .......... 74/443, 446, 457, 413, 411, 434, 437, 74/438, 458, 412 R
See application file for complete search history.

(56) References Cited

U.S. PATENT DOCUMENTS 5,890,398 A * 4/1999 Matsuno ...................... 74/433.5
2002/0096006 A1 * 7/2002 Hahlbrock et al. ............. 74/446

(Continued)

FOREIGN PATENT DOCUMENTS

DE   10 2009 012 812   10/2009
JP   8 105504           4/1996

(Continued)

OTHER PUBLICATIONS

Office Action issued Mar. 5, 2013, in Japanese Patent Application No. 2012-510459, filed Feb. 24, 2012 (with English language translation).

(Continued)

*Primary Examiner* — Troy Chambers
*Assistant Examiner* — Zakaria Elahmadi
(74) *Attorney, Agent, or Firm* — Oblon, Spivak, McClelland, Maier & Neustadt, L.L.P.

(57) ABSTRACT

In the helical gear, an opening perimeter wall includes a first arc side face located at the leading end side in the direction of rotation, concave towards the leading end side in the direction of rotation, and having a distance from the arc center as a first radius. The first arc side face includes a side face at a side of the rotation center of the hub, located at position with a distance from the arc center differing from the length of the first radius, on a verge of a virtual arcuate line centered about the rotation center, and passing through the arc center.

14 Claims, 19 Drawing Sheets

(56) References Cited

U.S. PATENT DOCUMENTS

| | | |
|---|---|---|
| 2009/0042655 A1* | 2/2009 | Iwata et al. ............... 464/98 |
| 2010/0043580 A1* | 2/2010 | Bernier ................. 74/412 R |
| 2010/0132495 A1* | 6/2010 | Bernier ................... 74/434 |
| 2010/0326224 A1 | 12/2010 | Shimizu |
| 2012/0325037 A1* | 12/2012 | Teramoto et al. ........... 74/434 |
| 2013/0000435 A1* | 1/2013 | Uenishi et al. ............ 74/425 |
| 2013/0091970 A1* | 4/2013 | O-oka et al. ............... 74/458 |

FOREIGN PATENT DOCUMENTS

| | | |
|---|---|---|
| JP | 2002 147322 | 5/2002 |
| JP | 2005 069401 | 3/2005 |
| JP | 2005 325865 | 11/2005 |
| JP | 2006-258180 | 9/2006 |
| JP | 2006 266495 | 10/2006 |
| JP | 2008 303968 | 12/2008 |
| JP | 2009 228741 | 10/2009 |
| JP | 2010 101334 | 5/2010 |

OTHER PUBLICATIONS

International Search Report issued on Oct. 18, 2011 in PCT/JP11/070929 filed on Sep. 14, 2011.

* cited by examiner

HELICAL GEAR AND POWER TRANSMISSION APPARATUS

TECHNICAL FIELD

The present invention relates to a helical gear and a power transmission apparatus.

BACKGROUND ART

FIGS. 18 and 19 show a schematic configuration of a helical gear 21Z. FIGS. 18 and 19 depict the manner of the teeth oblique (inclined) at the meshing site of the gear. The degree of obliquity is depicted in an exaggerated manner for the sake of understanding.

Helical gear 21Z includes a hub 22a mounted on a rotation shaft, a disk 22b extending outward in the radial direction of the rotation shaft from hub 22a, and a rim 22c provided at the outer side of disk 22b. Teeth 22d oblique relative to the direction of rotation (R) of gear 21Z is provided at the outer peripheral face of rim 22c.

Helical gear 21Z has the teeth oblique to the direction of rotation of the gear. Accordingly, the engaging torque is dispersed in a direction crossing the direction of rotation of the gear (thrust direction (S direction in FIG. 19)) to suppress noise with little variation in torque. However, as shown in FIG. 19, dispersion of torque causes helical gear 21Z to incline towards the thrust direction (S direction), whereby vibration and noise increase. Therefore, sufficient suppression of vibration and noise cannot be expected.

The gear disclosed in Japanese Patent Laying-Open Nos. 2009-228741 (PTL 1), 2010-101334 (PTL 2), 2008-303968 (PTL 3), 2005-325865 (PTL 4) and 2005-069401 (PTL 5) have the vibration and noise suppressed by providing a through hole in the disk of the gear and devising the rigidity of the disk.

CITATION LIST

Patent Literature

PTL 1: Japanese Patent Laying-Open No. 2009-228741
PTL 2: Japanese Patent Laying-Open No. 2010-101334
PTL 3: Japanese Patent Laying-Open No. 2008-303968
PTL 4: Japanese Patent Laying-Open No. 2005-325865
PTL 5: Japanese Patent Laying-Open No. 2005-069401

SUMMARY OF INVENTION

Technical Problem

FIGS. 20 and 21 show a schematic configuration of a helical gear 21Y. FIGS. 20 and 21 depict the manner of the teeth oblique (inclined) at the meshing site of the gear. The degree of obliquity is depicted in an exaggerated manner for the sake of understanding.

Helical gear 21Y includes a plurality of through holes H21 at disk 22b, extending in the circumferential direction about the rotation shaft. By altering the rigidity along the circumferential direction of disk 22b at the region between hub 22a and rim 22c, helical gear 21Z can be made to tilt greatly towards the thrust direction, as shown in FIG. 21. Thus, increase in vibration and noise is suppressed.

In view of hub 22a from rim 22c in the radial direction of the rotation shaft, the rigidity varies abruptly between the region of disk 22b where through hole H21 is not formed and the region of disk 22b where through hole H21 is formed.

Therefore, at the leading end side of through hole H21 in the direction of rotation of helical gear 21Y (the most leading end side (the region surrounded by A1 in FIG. 20) in direction of rotation R1, the stress generated at disk 22b significantly increases, leading to the possibility of insufficient strength in rim 22c at the mesh advancing direction side of through hole H21. In the case where the thickness of disk 22b is increased, for example, to overcome this insufficient strength, the rigidity will become higher, leading to the possibility of more vibration and noise.

In view of the problem set forth above, the present invention is directed to providing a helical gear and a power transmission apparatus based on a configuration in which vibration and noise are suppressed, and the stress at the leading end side in the direction of rotation of a through hole provided at a disk can be reduced.

Solution to Problem

A helical gear according to the present invention includes a hub mounted on a rotation shaft and having a rotation center, a disk extending from the rotation center of the hub towards an outer side in a radial direction, and a rim provided at the outer side of the disk. The rim includes a plurality of teeth at the outer peripheral face. The disk includes a plurality of opening perimeter walls defining through holes provided along the perimeter of the hub.

The opening perimeter wall includes a first arc side face located at the leading end side in the direction of rotation, concave towards the leading end side in the direction of rotation, and having a distance from the arc center as a first radius. The first arc side face includes a side face at a side of the rotation center of the hub, located at a position with a distance from the arc center differing from the length of the first radius, on a verge of a virtual arcuate line centered about the rotation center and passing through the arc center.

In another embodiment, the opening perimeter wall includes an inner peripheral side face located at the hub side, an outer peripheral side face located at the side closer to the rim than the inner peripheral side face, a first arc side face joining one end of the inner peripheral side face and one end of the outer peripheral side face, and a second arc side face joining the other end of the inner peripheral side face and the other end of the outer peripheral side face.

The inner peripheral side face constitutes a portion of an arc having a second radius centered about the rotation center of the hub. The outer peripheral side face constitutes a portion of an arc centered about the rotation center of the hub, and having a third radius larger than the second radius. The arc center of the first arc side face is located on the middle radius arcuate line that runs along the center spot between the inner peripheral side face and the outer peripheral side face.

In another embodiment, the distance of a perpendicular line from the arc center to the side face is shorter than the length of the first radius.

In another embodiment, the distance in the radial direction between the inner peripheral side face and the outer peripheral side face is set equal to two times the length of the first radius.

In another embodiment, the side face is provided to meet an intersection point of the first arc side face where the virtual arcuate line crosses.

In another embodiment, the side face is provided to extend up to the outer peripheral side face side, with the virtual arcuate line as a verge.

In another embodiment, the side face is provided to meet the inner peripheral side face.

In another embodiment, the distance in the radial direction between the inner peripheral side face and the outer peripheral side face is set shorter than two times the length of the first radius.

In another embodiment, the side face is a curved face having the same second radius centered about the rotation center identical to the rotation center of the inner peripheral side face.

In another embodiment, the distance in the radial direction between the inner peripheral side face and the outer peripheral side face is set shorter than two times the length of the first radius. The distance of the perpendicular line from the arc center to the side face is identical to the distance of the first radius. The side face is provided to meet the inner peripheral side face.

In another embodiment, the second arc side face is provided having a shape symmetric to the first arc side face with the inner peripheral side face and outer peripheral side face therebetween.

In another embodiment, the opening perimeter wall includes the first arc side face at the leading end side in the direction of rotation, and the second arc side face at the tail end side in the direction of rotation. The opening perimeter wall takes a circular shape by the first arc side face and the second arc side face. The side face is provided to meet an intersection point of the first arc side face where the virtual arcuate line crosses.

In another embodiment, the second arc side face is provided having a shape symmetric to the first arc side face about a radial line that passes through the rotation center and the arc center.

A power transmission apparatus according to the present invention includes the helical gear set forth above.

Advantageous Effects of Invention

According to a helical gear and a power transmission apparatus of the present invention, there can be provided a helical gear and a power transmission apparatus based on a configuration in which vibration and noise are suppressed, and stress generated at the leading end side in the direction of rotation of a through hole provided at a disk can be reduced.

DESCRIPTION OF EMBODIMENTS

Figure 1:
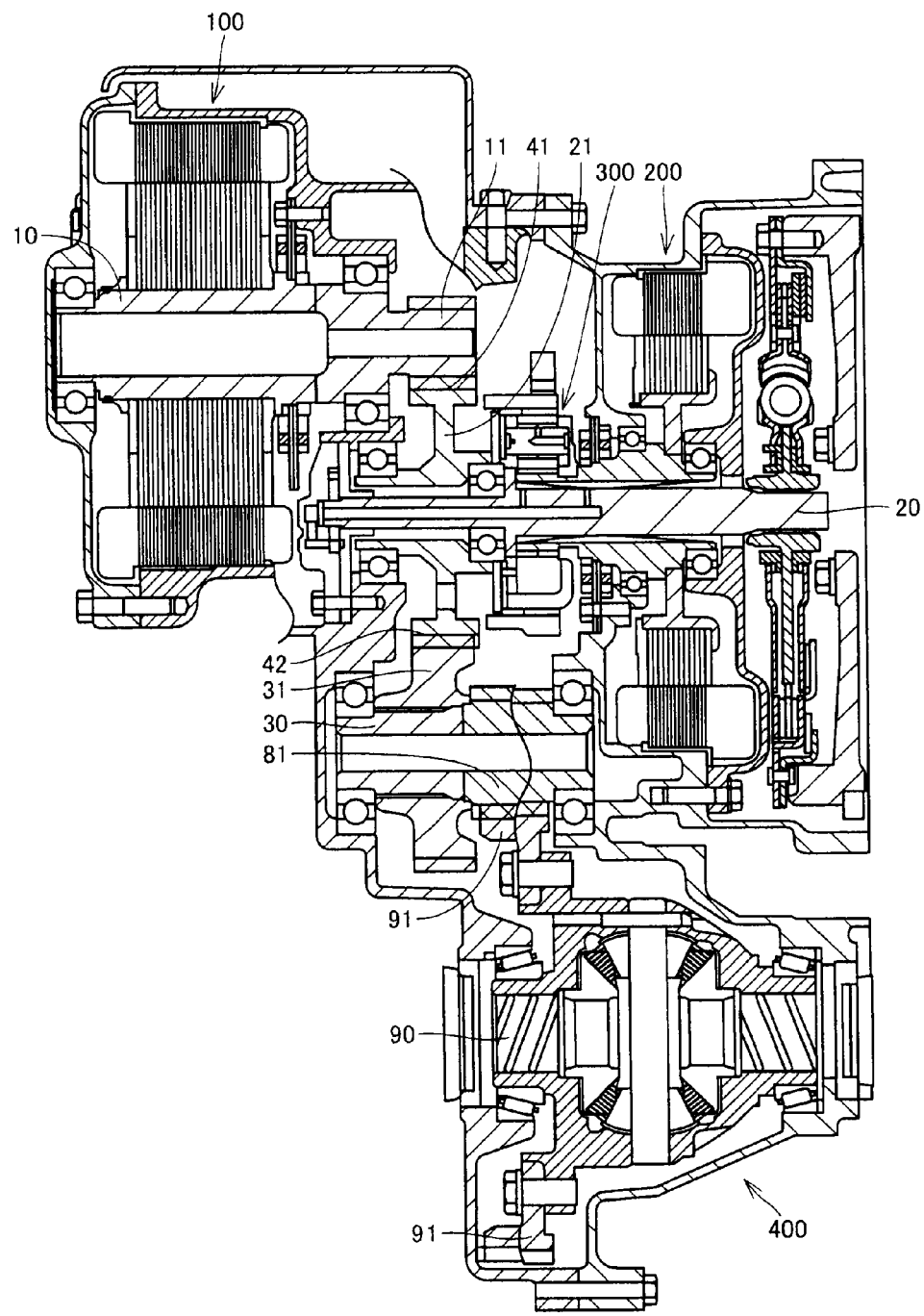
FIG. 1 is a sectional view of a configuration of a transaxle (power transmission apparatus), having a transmission with a helical gear according to an embodiment of the present invention and an axle formed integrally.

Embodiments of the present invention will be described hereinafter with reference to the drawings. In the drawings, the same or corresponding elements have the same reference characters allotted, and description thereof will not be repeated.

In the embodiment set forth below, each of the constituent elements is not necessarily mandatory in the present invention unless otherwise noted. Furthermore, the reference to the number, amount, and the like in the embodiments set forth below is only a way of example, unless otherwise particularly stated. The scope of the present invention is not limited to the cited number, amount, and the like. It is intended that the configuration of each of the embodiments may be appropriately combined for usage.

FIG. 1 is a sectional view of a configuration of a transaxle having a transmission with a gear device to which a helical gear of the present embodiment is employed and an axle formed integrally. The transmission shown in FIG. 1 is employed in a front-wheel drive type hybrid vehicle.

Referring to FIG. 1, the transaxle includes rotating electric machines 100 and 200, a planetary gear 300 for power splitting, and a differential mechanism 400. Rotating electric machines 100 and 200, planetary gear 300, and differential mechanism 400 are provided in a housing.

Rotating electric machine 100 includes a rotation shaft 10 as a first shaft, provided rotatable with respect to the housing. Rotating electric machine 200 includes a rotation shaft 20 as a second shaft, provided rotatable with respect to the housing. Rotating electric machines 100 and 200 include a stator core formed by a stacked layer of electromagnetic steel plates, and a stator coil wound around the stator core. The stator coil has a terminal connected to a feed cable from an external power supply to establish electrical connection with the external power supply and the stator coil.

Planetary gear 300 is connected to rotation shaft 20. Planetary gear 300 splits the engine power transmitted via rotation shaft 20 to rotation shaft 10 and a rotation shaft 30 qualified as a third shaft for transmission.

Differential mechanism 400 includes a final driven gear 91. Final driven gear 91 is connected to rotation shaft 30 through final drive gear 81. Differential unit 90 receiving the power transmitted from rotation shaft 30 transmits equal driving power to both wheels while changing the rotating speed of the left and right wheels at the time of turning.

Thus, the transaxle shown in FIG. 1 functions as a power transmission apparatus transmitting the rotary driving force applied through the motor and the crankshaft of engine for output to the drive wheel.

The transaxle employs a gear device of a 3-shaft structure including a gear with two meshing sites for the transmission providing the motor power and engine power to realize downsizing, weight saving, and low cost.

Rotation shaft 10 has a first gear 11 provided. Rotation shaft 20 has a second gear 21 provided. Rotation shaft 30 has a third gear 31 provided. A helical gear is used for each of first gear 11, second gear 21 and third gear 31.

Figure 2:
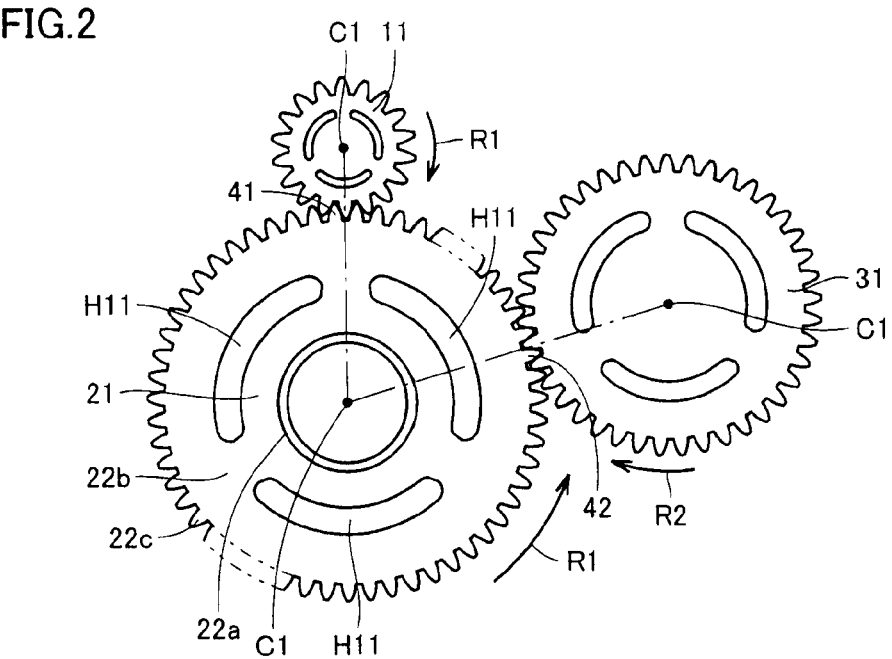
FIG. 2 is a schematic diagram showing the meshing state of a gear device of a 3-shaft structure, including a helical gear of the present embodiment.

FIG. 2 schematically represents a meshing state of the gear device of a 3-shaft structure. As shown in FIG. 2, first gear 11 and second gear 21 mesh with each other at a meshing point 41. Second gear 21 and third gear 31 mesh with each other at a meshing point 42. The power transmission apparatus includes a gear device with first gear 11, second gear 21 and third gear 31. Meshing point 41 is where first gear 11 meshes with second gear 21. Meshing point 42 is where second gear 21 meshes with third gear 31.

Figure 3:
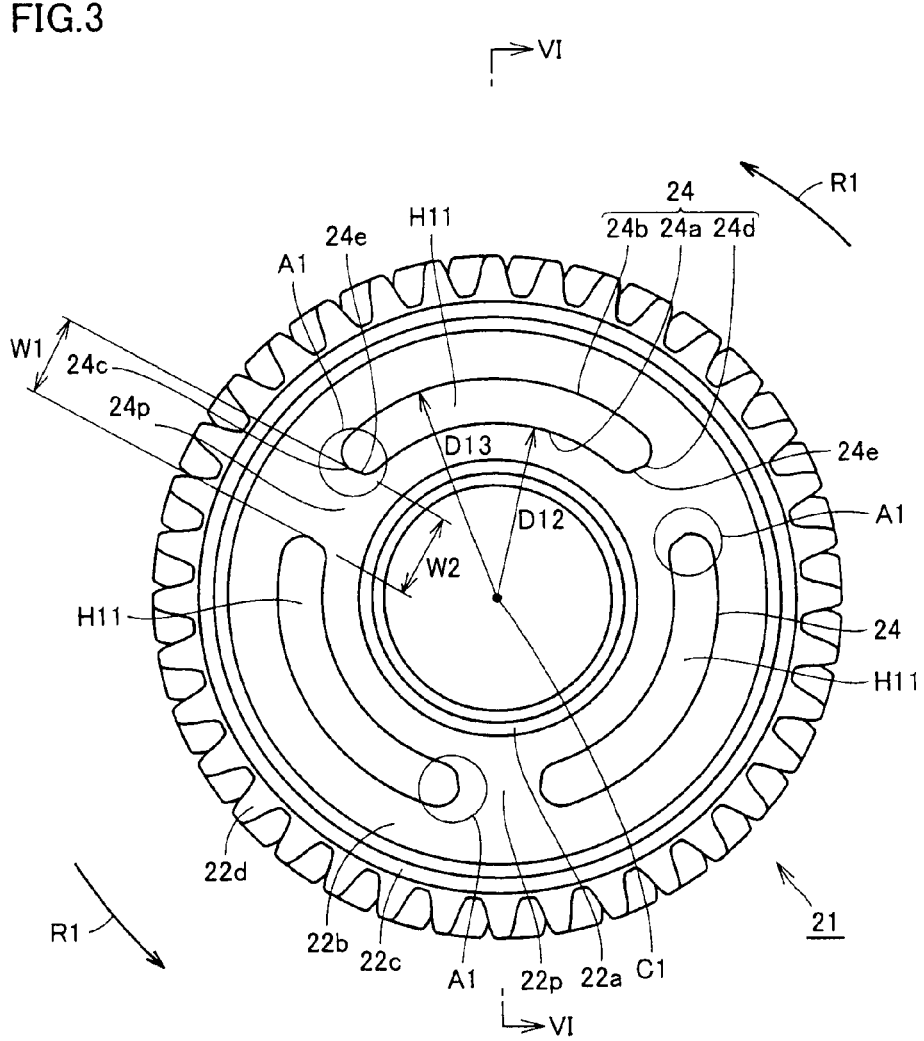
FIG. 3 represents a front view of a helical gear of the present embodiment.
Figure 4:
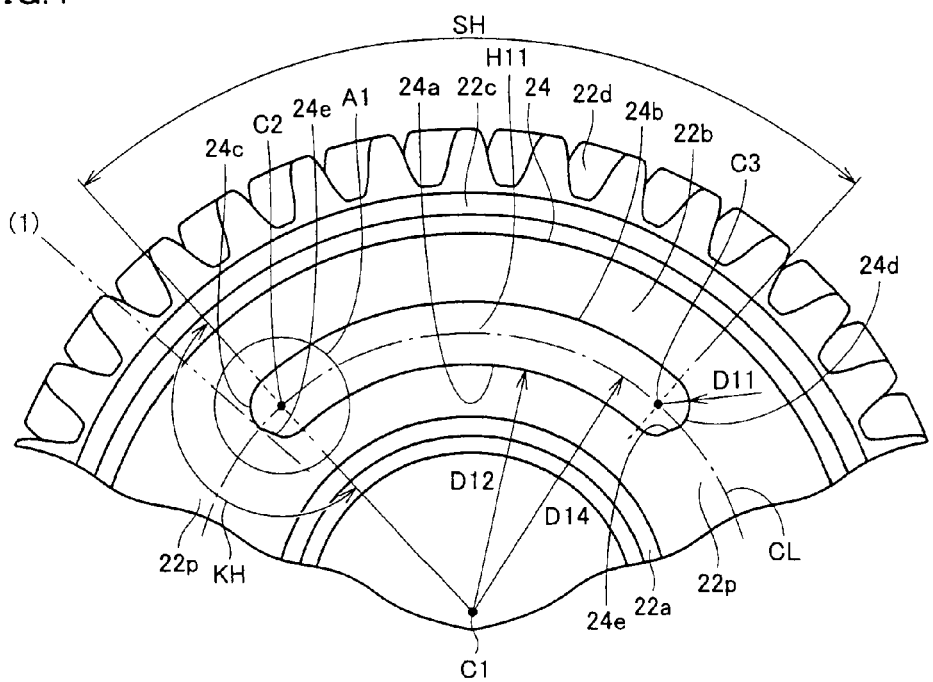
FIG. 4 is a partial enlarged front view of a helical gear of the present embodiment.
Figure 5:
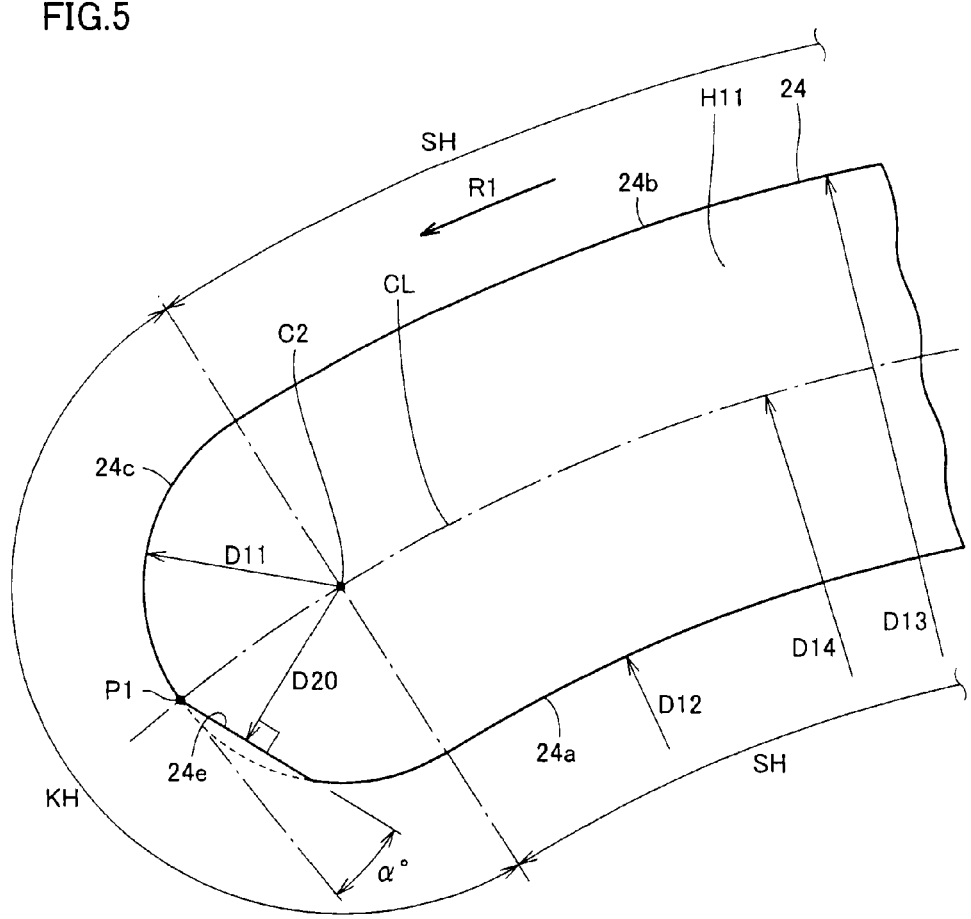
FIG. 5 is a partial enlarged view of the region surrounded by A1 in FIG. 4.
Figure 6:
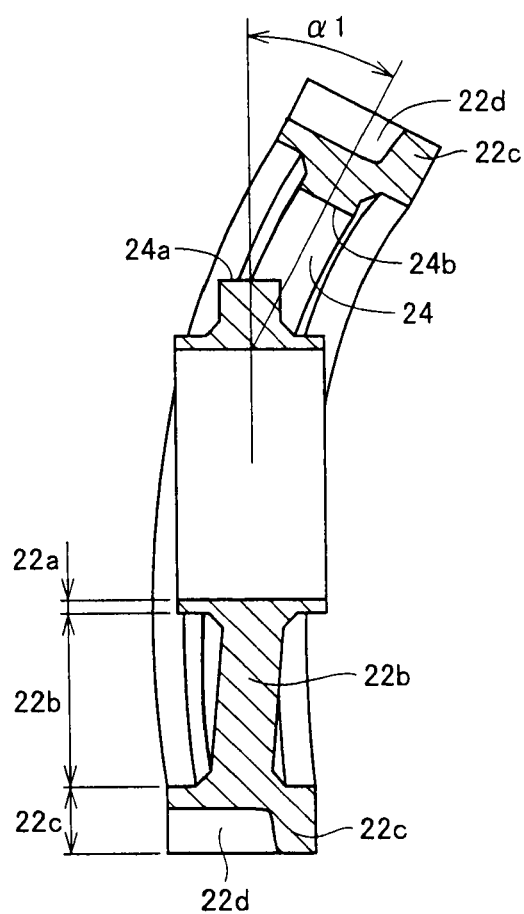
FIG. 6 is a sectional view representing deformation in the helical gear in a meshing state corresponding to arrow VI-VI in FIG. 3.

A detailed configuration of helical gear 21 functioning as the second gear will be described with reference to FIGS. 3-6. FIGS. 3 and 4 are a front view and a partial enlarged front view, respectively, of helical gear 21. FIG. 5 is a partial enlarged view of the region surrounded by A1 in FIG. 4. FIG. 6 is a sectional view representing deformation in the helical gear in a meshing state corresponding to arrow VI-VI in FIG. 3. A helical gear similar to that of the present embodiment is preferably employed as the helical gears for first gear 11 and third gear 31.

Referring to FIGS. 3-5, helical gear 21 includes a hub 22a mounted on a rotation shaft 20, and having a rotation center C1, a disk 22b extending from hub 22a towards the outer side in a radial direction of rotation shaft 20, and a rim 22c provided at the outer side of disk 22b. Rim 22c includes a plurality of teeth 22d at its outer peripheral face.

Disk 22b includes an opening perimeter wall 24 defining a through hole H11 that is provided along the perimeter of hub 22a. In the present embodiment, opening perimeter wall 24 is provided at three sites at the pitch of 120°.

Opening perimeter wall 24 defining through hole H11 includes an inner peripheral side face 24a located at the hub 22a side, an outer peripheral side face 24b located at the side closer to rim 22c than inner peripheral side face 24a, a first arc side face 24c joining one end of inner peripheral side face 24a and one end of outer peripheral side face 24b, and a second arc side face 24d joining the other end of inner peripheral side face 24a and the other end of outer peripheral side face 24b. As used herein, one end implies the leading end side in the direction of rotation (R1), and the other end implies the tail end side in the direction of rotation.

Referring to FIG. 5, first arc side face 24c is located at the leading end side in the direction of rotation, concave towards the leading end side in the direction of rotation, where the direction of rotation of helical gear 21 is R1, and having a distance from the arc center C2 as a first radius D11. First arc side face 24c includes a side face 24e at a side of rotation center C1 of hub 22a, located at a position with a distance from arc center C2 differing from the length of first radius D11, on a verge of a virtual arcuate line CL centered about rotation center C1 and passing through an arc center C2.

Inner peripheral side face 24a constitutes a portion of an arc having a second radius D12 centered about rotation center C1 of hub 22a. Outer peripheral side face 24b constitutes a portion of an arc centered about rotation center C1 of hub 22a, and having a third radius D13 larger than second radius D12. Arc center C2 of first arc side face 24c is located on the middle radius arcuate line CL that runs along the middle spot between inner peripheral side face 24a and outer peripheral side face 24b.

At opening perimeter wall 24 defining through hole H11, inner peripheral side face 24a and outer peripheral side face 24b define the hole contour in the direction of the rotation shaft, whereas first arc side face 24c and second arc side face 24d define the hole contour in the circumferential direction.

The distance between inner peripheral side face 24a and outer peripheral side face 24b in the radial direction (D13–D12) is set equal to two times the length of first radius D11.

Side face 24e of the present embodiment has a straight shape. Side face 24e is provided such that the distance D20 of the perpendicular line from arc center C2 to side face 24e is shorter than the length of first radius D11. Side face 24e is provided to pass through an intersection point P1 of first arc side face 24c where virtual arcuate line CL meets. The angle (α°) between a tangent line SL of first arc side face 24c passing through intersection point P1 and side face 24e is but not limited to approximately 20° in the present embodiment.

Referring to FIG. 3 again, the provision of side face 24e at first arc side face 24c allows the width in the circumferential direction of disk 22b (pillar portion 22p) located between adjacent first arc side face 24c and second arc side face 24d to be set such that the distance W2 between the lower ends at the rotation center C1 side of respective side faces 24e can be made greater as compared to the conventional configuration, where W1 is the distance between intersection points P1 of respective side faces 24e.

At opening perimeter wall 24 defining through hole H11 of the present embodiment, second arc side face 24d is provided symmetric to first arc side face 24c with inner peripheral side face 24a and outer peripheral side face 24b therebetween. Accordingly, when the direction of rotation of helical gear 21 corresponds to a counterclockwise direction of rotation R1 shown in FIG. 3, first arc side face 24c is located at the leading end side in the direction of rotation. When the direction of rotation of helical gear 21 corresponds to the clockwise direction that is opposite to rotation direction R1 shown in FIG. 3, second arc side face 24d is located at the leading end side in the direction of rotation.

Figure 7:
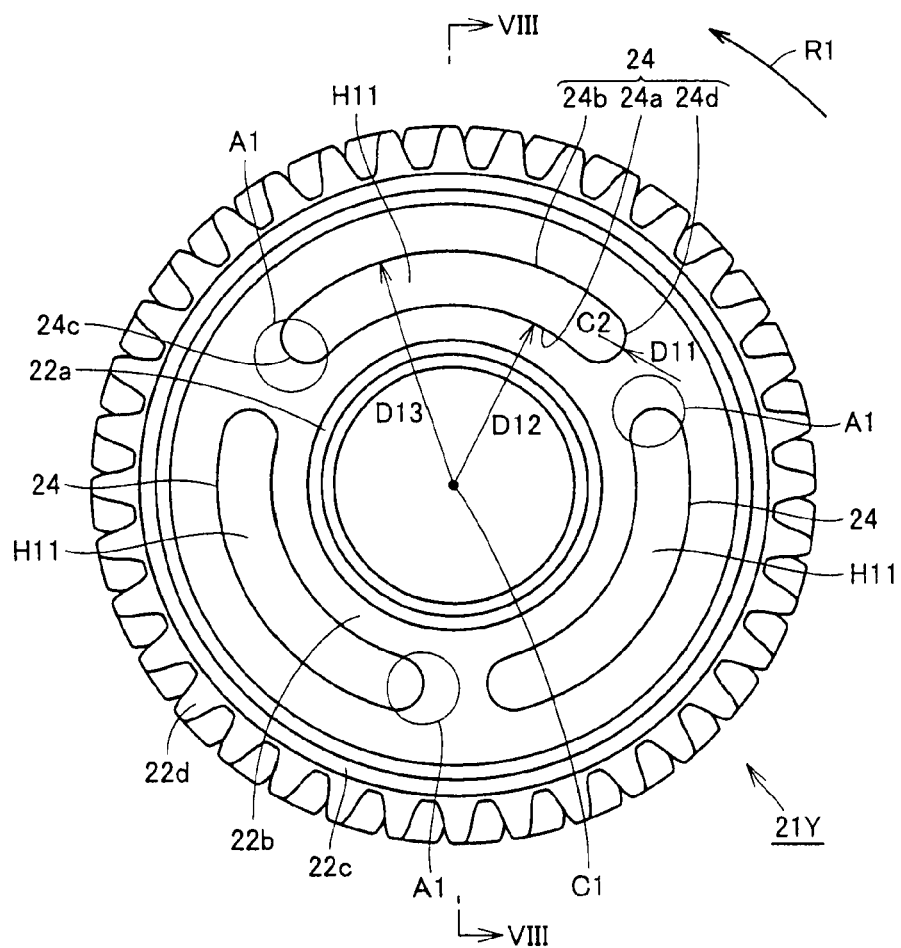
FIG. 7 is a front view of a helical gear according to background art.
Figure 8:
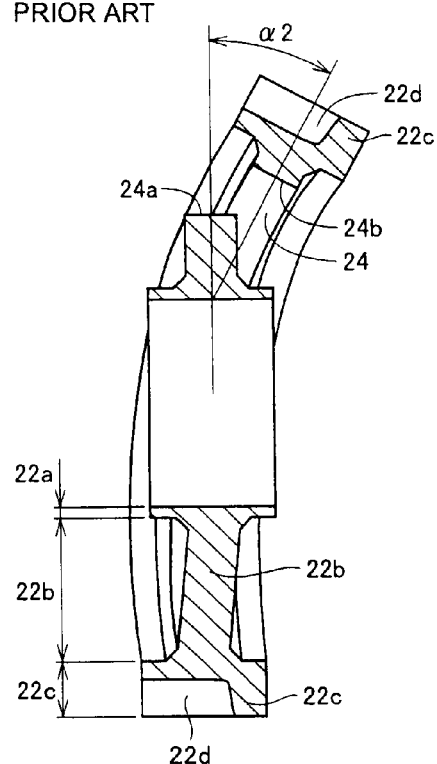
FIG. 8 is a sectional view corresponding to arrow VIII-VIII in FIG. 7.

The configuration of a helical gear 21Y according to background art will be described hereinafter with reference to FIGS. 7 and 8. FIG. 7 is a front view of a helical gear 21Y according to background art. FIG. 8 is a sectional view representing deformation in helical gear 21Y in a meshing state corresponding to arrow VIII-VIII in FIG. 7.

Helical gear 21 of the present embodiment shown in FIGS. 3-6 and helical gear 21Y of the background art have the same basic configuration, and differ in the configuration of opening perimeter wall 24 defining through hole H21 provided in disk 22b.

At opening perimeter wall 24 defining through hole H11 in helical gear 21Y shown in FIG. 7, first arc side face 24c has a semicircular shape, absent of side face 24e employed in the present embodiment.

Upon comparing, based on FIGS. 5 and 8, the deformation in helical gear 21 at a meshing state according to the present embodiment corresponding to the configuration of FIG. 3 and helical gear 21Y according to the background art shown in FIG. 7, the angle of inclination (α1) of helical gear 21 of the present embodiment shown in FIG. 3 is smaller than the angle of inclination (α2) of helical gear 21Y shown in FIG. 8.

Figure 19:
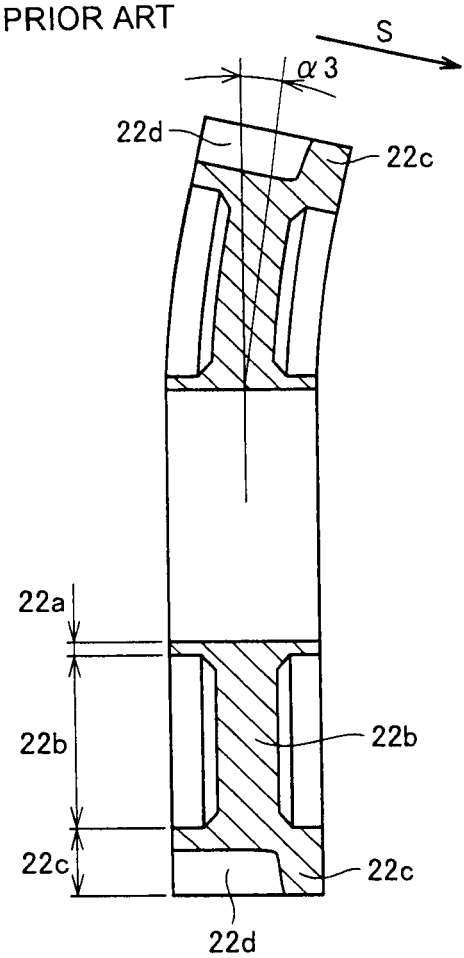
FIG. 19 is a sectional view corresponding to arrow XIX-XIX in FIG. 18.
Figure 20:
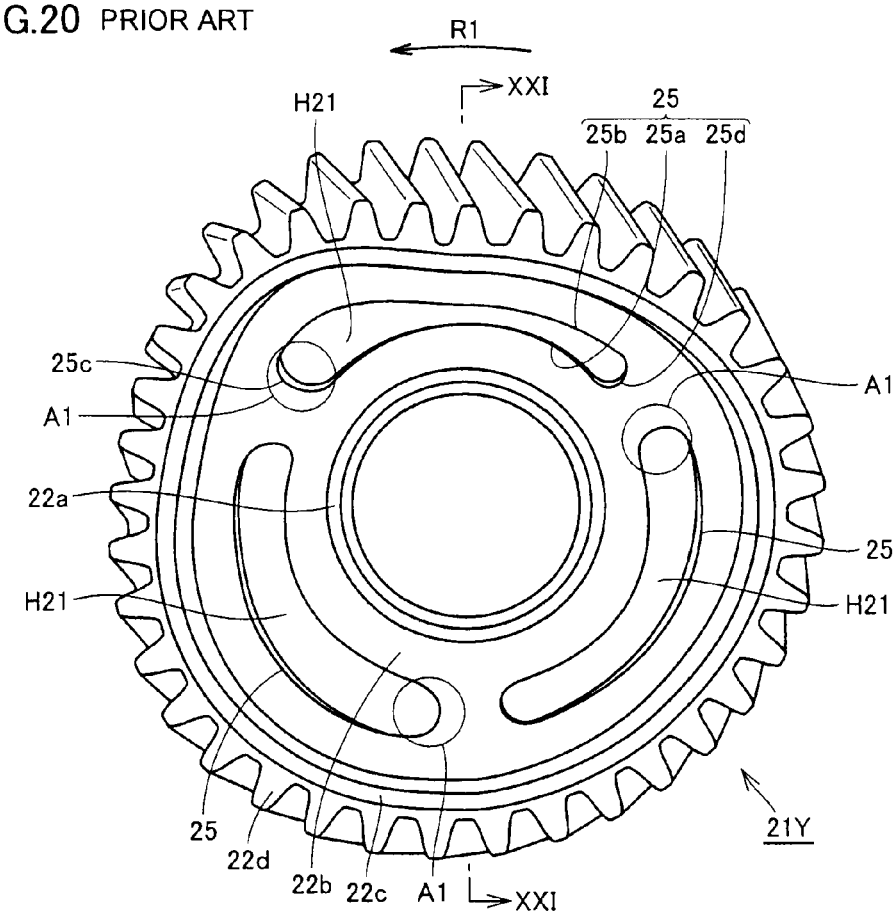
FIG. 20 is a front view representing deformation in the helical gear in a meshing state according to background art.
Figure 21:
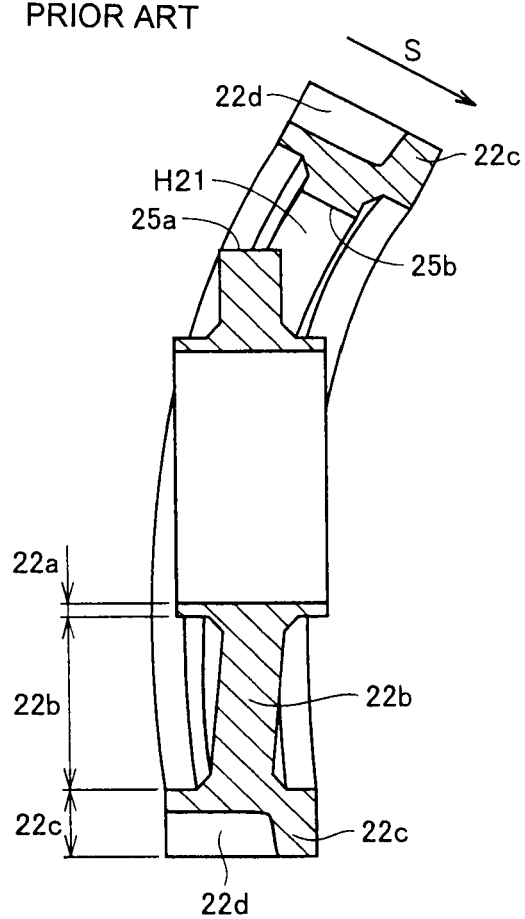
FIG. 21 is a sectional view corresponding to arrow XXI-XXI in FIG. 20.

The angle of inclination (α1) of helical gear 21 of the present embodiment is greater than the angle of inclination (α3) of helical gear 21Z absent of a through hole in disk 22b shown in FIG. 19. Thus, there is established the relationship of the angle of inclination (α2) of helical gear 21Y> the angle of inclination (α1) of helical gear 21> the angle of inclination (α3) of helical gear 21Z.

In the case where the gear attain a meshing state at the region where the difference in rigidity is great between the through hole and the disk, great deformation occurs at the helical gear. As a result, the meshing teeth are urged against the region of great rigidity to deform. Accordingly, the meshing root is pulled to cause higher stress at the root. Therefore, it is considered that the strength at the root is degraded significantly in a gear having a through hole provided at the disk, causing generation of large stress.

In the case where side face 24e is provided at first arc side face 24c at the leading end side in the direction of rotation, when viewed relative to through hole H11 in the direction of rotation in the helical gear of the present embodiment, the rigidity of disk 22b at this region is increased, allowing reduction in the stress generated in the proximity of first arc side face 24c when in a meshing state of the gear. As a result, deformation of the teeth being urged against the region of higher rigidity can be alleviated, allowing increase of the root stress to be suppressed.

According to the helical gear of the present embodiment, stress and noise can be suppressed, and the stress occurring at the through hole provided in the disk at the leading end side in the direction of rotation can be reduced. As a result, the performance of a gear device employing such a helical gear, as well as a transaxle including the gear device can be improved.

Figure 9:
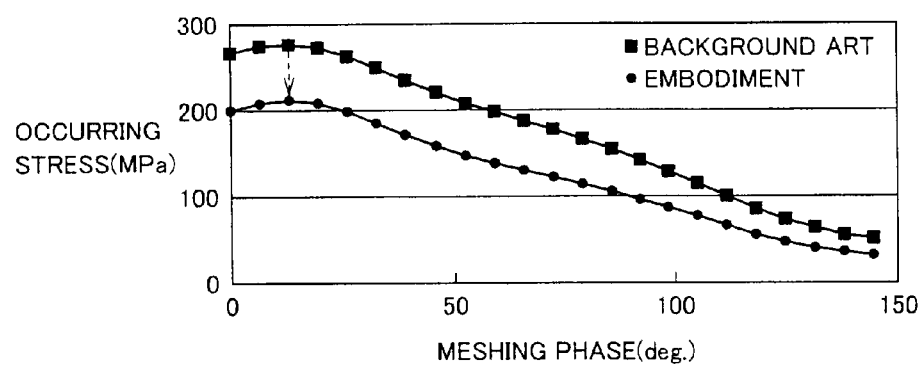
FIG. 9 represents the relationship between generated stress and meshing phase of the helical gear.

FIG. 9 represents the relationship between the occurring stress and meshing phase of the helical gear. It was confirmed that the stress occurring in the proximity of first arc side face 24c at opening perimeter wall 24 in disk 22b during the initial stage of the meshing phase is reduced from approximately 280 Mpa to approximately 210 Mp.

Other Embodiments

Figure 10:
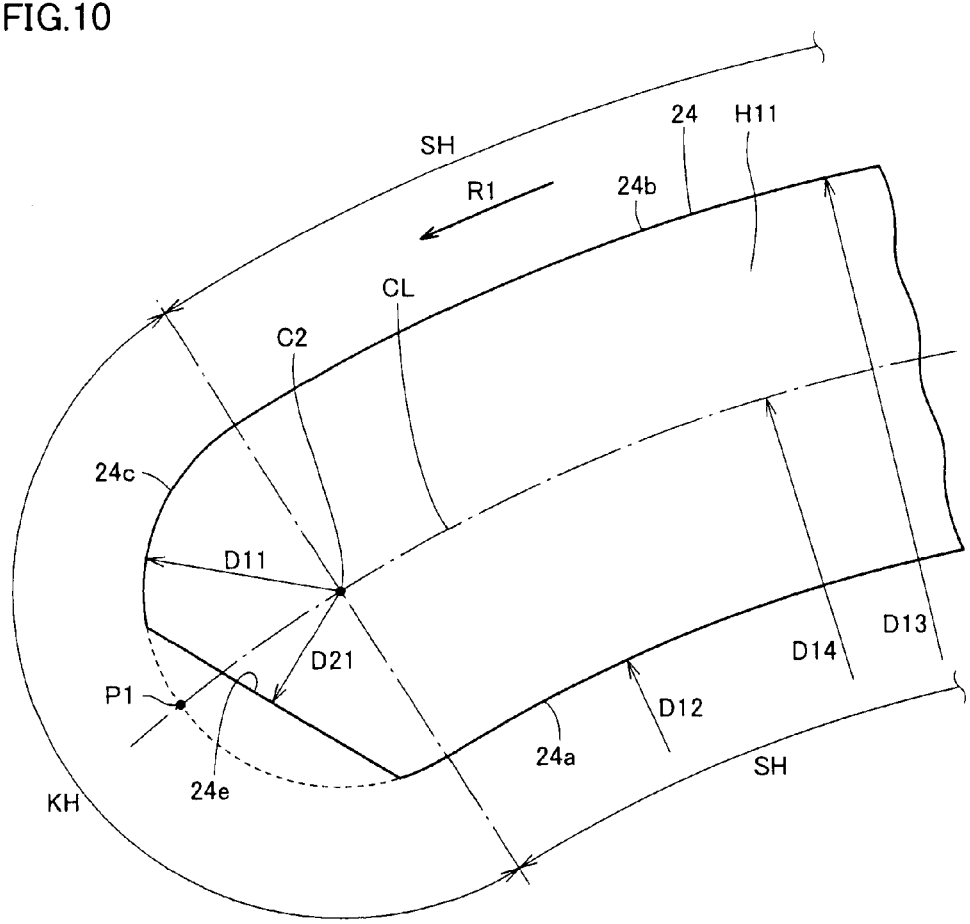
FIG. 10 represents another embodiment corresponding to a partial enlarged view of the region surrounded by A1 in FIG. 4.
Figure 11:
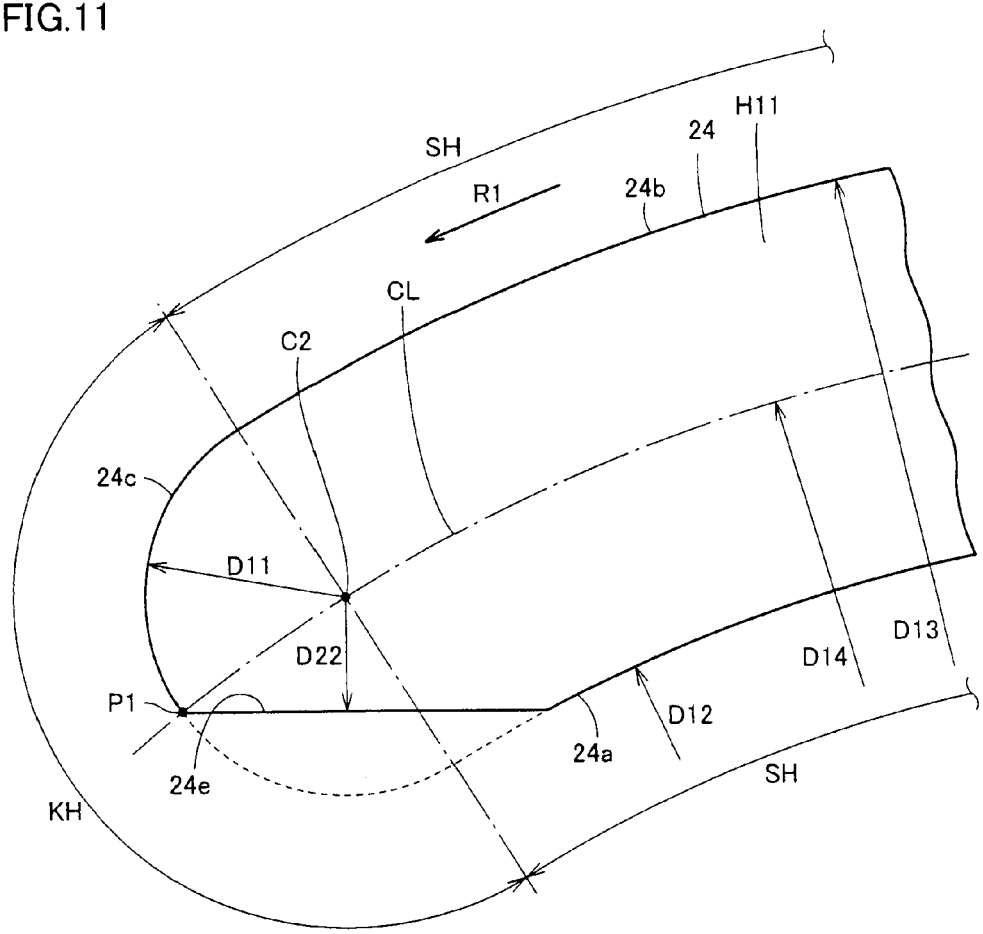
FIG. 11 represents still another embodiment corresponding to a partial enlarged view of the region surrounded by A1 in FIG. 4.
Figure 12:
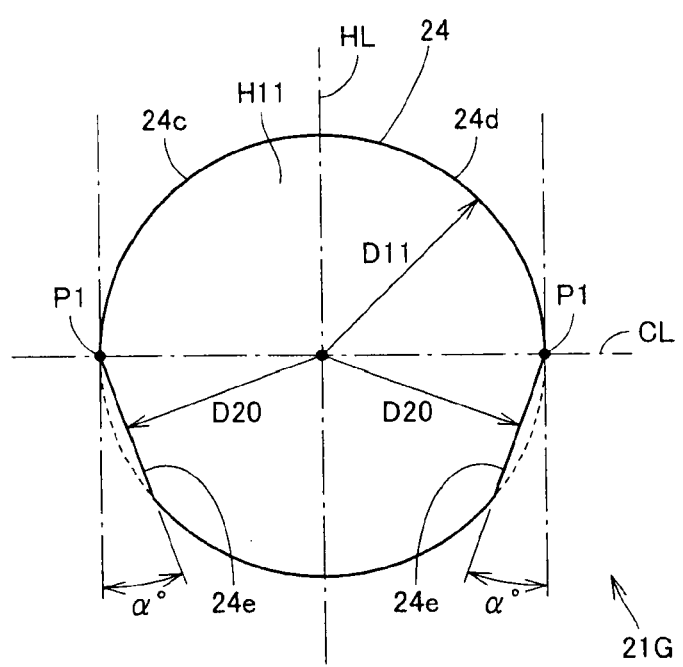
FIG. 12 represents still another embodiment corresponding to a partial enlarged view region surrounded by A1 in FIG. 4.

Another embodiment of first arc side face 24c having a side face 24e at opening perimeter wall 24 defining through hole H11 employed in the present embodiment will be described in FIGS. 10-12. A similar manner is employed for second arc side face 24d. FIGS. 10-12 show another embodiment corresponding to a partial enlarged view of a region surrounded by A1 in FIG. 4.

At first arc side face 24c of opening perimeter wall 24 defining through hole H11 shown in FIG. 10, side face 24e does not pass through intersection point P1 where a virtual arcuate line CL of first arc side face 24c meets, and extends up to the side of outer peripheral side face 24b with virtual arcuate line CL as the verge. Side face 24e is provided such that the distance D21 of the perpendicular line from arc center C2 to side face 24e is shorter than the length of first radius D11.

At first arc side face 24c of opening perimeter wall 24 defining through hole H11 shown in FIG. 11, side face 24e is provided to pass through intersection point P1 of first arc side face 24c where virtual arcuate line CL crosses, and meets inner peripheral side face 24a. Side face 24e is provided such that the distance D22 of the perpendicular line from arc center C2 to side face 24e is shorter than the length of first radius D11.

By virtue of through hole H11 having a first arc side face 24c of either FIG. 10 or 12, the rigidity of disk 22b at the region where side face 24e is provided is increased, allowing reduction in the stress occurring in the proximity of first arc side face 24c when in a meshing state of the gear, likewise with the helical gear shown in FIG. 3. As a result, the deformation of the teeth being urged against the region of higher rigidity can be alleviated, allowing increase of the root stress to be suppressed.

Thus, stress and noise can be suppressed, and the stress occurring at the leading end side in the direction of rotation of the through hole provided in the disk can be reduced. As a result, the performance of a gear device employing such a helical gear, as well as a transaxle including the gear device can be improved.

Through hole H11 shown in FIG. 12 does not have an inner peripheral side face 24a and outer peripheral side face 24b, differing from opening perimeter wall 24 that defines through hole H11 described in the foregoing. Opening perimeter wall 24 defining through hole H11 has a circular shape by a first arc side face 24c and a second arc side face 24d.

Side face 24e is provided so as to pass through interconnection point P1 of first arc side face 24c where virtual arcuate line CL crosses, likewise with the helical gear shown in FIG. 3. The angle (α°) between a tangent line SL of first arc side face 24c passing through interconnection point P1 and side face 24e is, but not limited to approximately 20° in the present embodiment.

Side face 24e is provided such that the distance D20 of the perpendicular line from arc center C2 to side face 24e is shorter than the length of first radius D11. Second arc side face 24d is provided to have a shape symmetric to first arc side face 24c about a radial line HL passing through rotation center C1 and arc center C2.

By virtue of through hole H11 having first arc side face 24c shown in FIG. 12, the rigidity of disk 22b at the region where side face 24e is provided is increased, allowing reduction in the stress occurring in the proximity of first arc side face 24c when in a meshing state of the teeth, likewise with the helical gear shown in FIG. 3. As a result, the deformation of the teeth being urged against the region of higher rigidity can be alleviated, allowing increase of the root stress to be suppressed.

Thus, stress and noise can be suppressed, and the stress occurring at the leading end side in the direction of rotation of the through hole provided in the disk can be reduced. As a result, the performance of a gear device employing such a helical gear, as well as a transaxle including the gear device can be improved.

Figure 13:
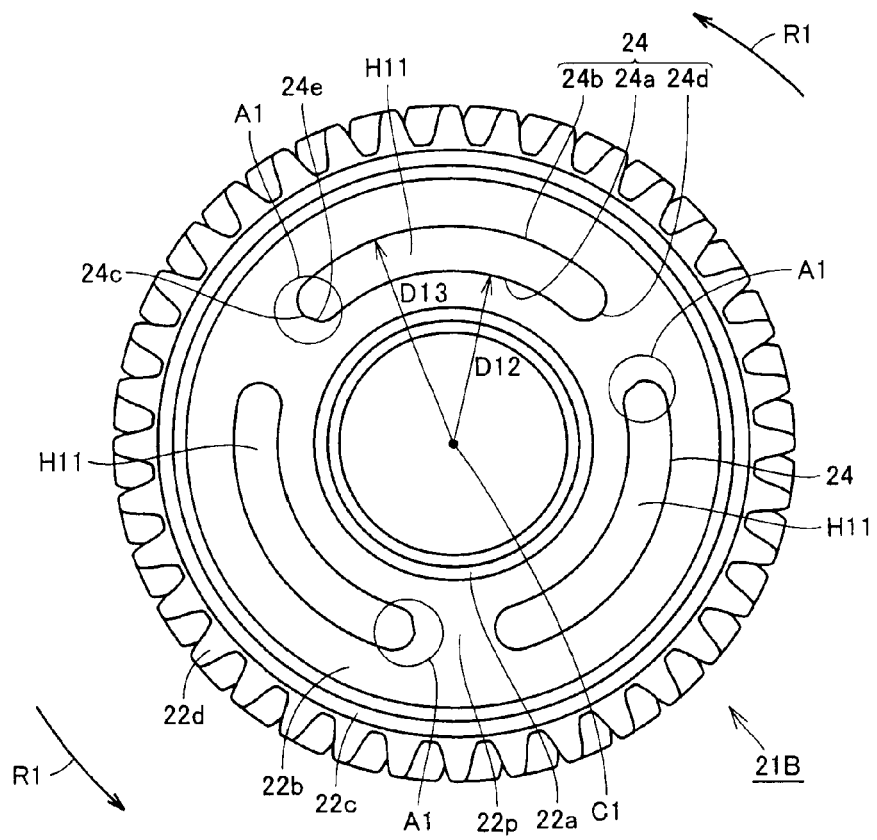
FIG. 13 is a front view of a helical gear according to another embodiment.

Although the above embodiments have been described corresponding to the case where opening perimeter wall 24 having symmetric first and second arc side faces 24c and 24d is employed, a helical gear 21B as shown in of FIG. 13 may be employed. Helical gear 21B includes an opening perimeter wall 24 having a side face 24e at only first arc side face 24c located at the leading end side in the direction of rotation (the region surrounded by A1 in the drawing), when the direction of rotation is in the counterclockwise direction (R1 direction).

Figure 14:
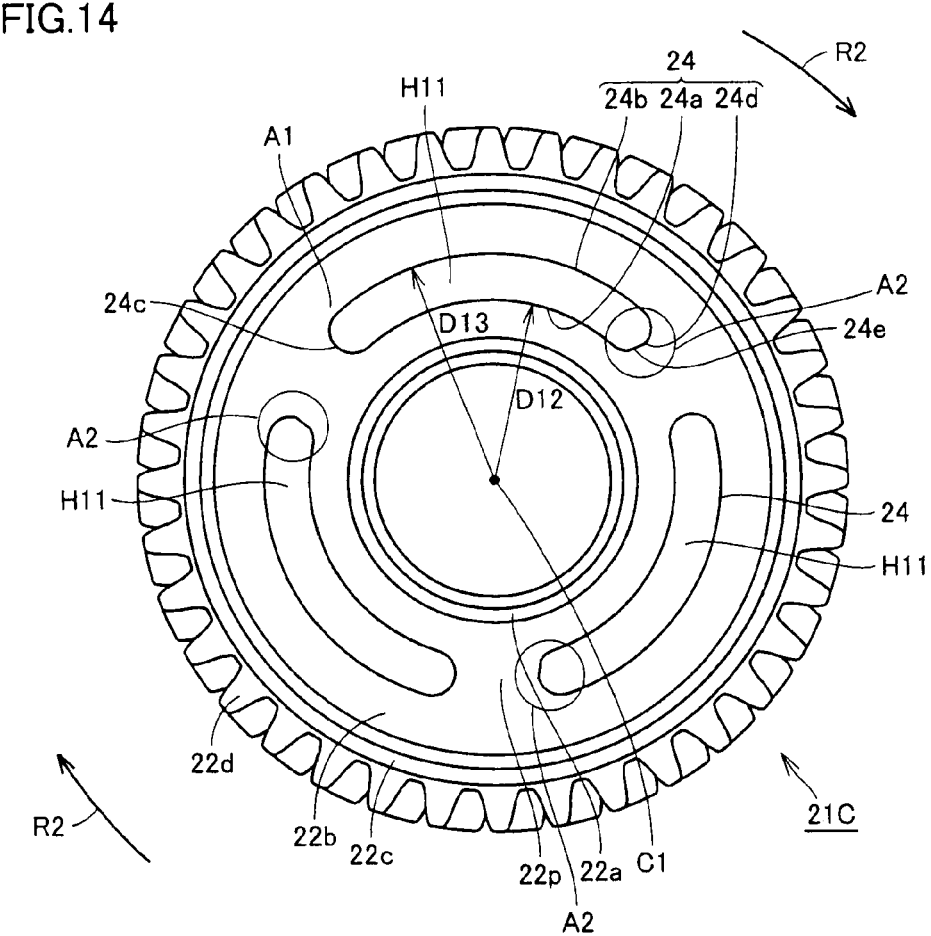
FIG. 14 is a front view of a helical gear according to still another embodiment.

Furthermore, an opening perimeter wall 24 having a side face 24e only at second arc side face 24d that is the leading end side in the direction of rotation (the region enclosed by A2 in the drawing), when the direction of rotation is in the clockwise direction (R2 direction), may be employed, as a helical gear 21C shown in FIG. 14.

Figure 15:
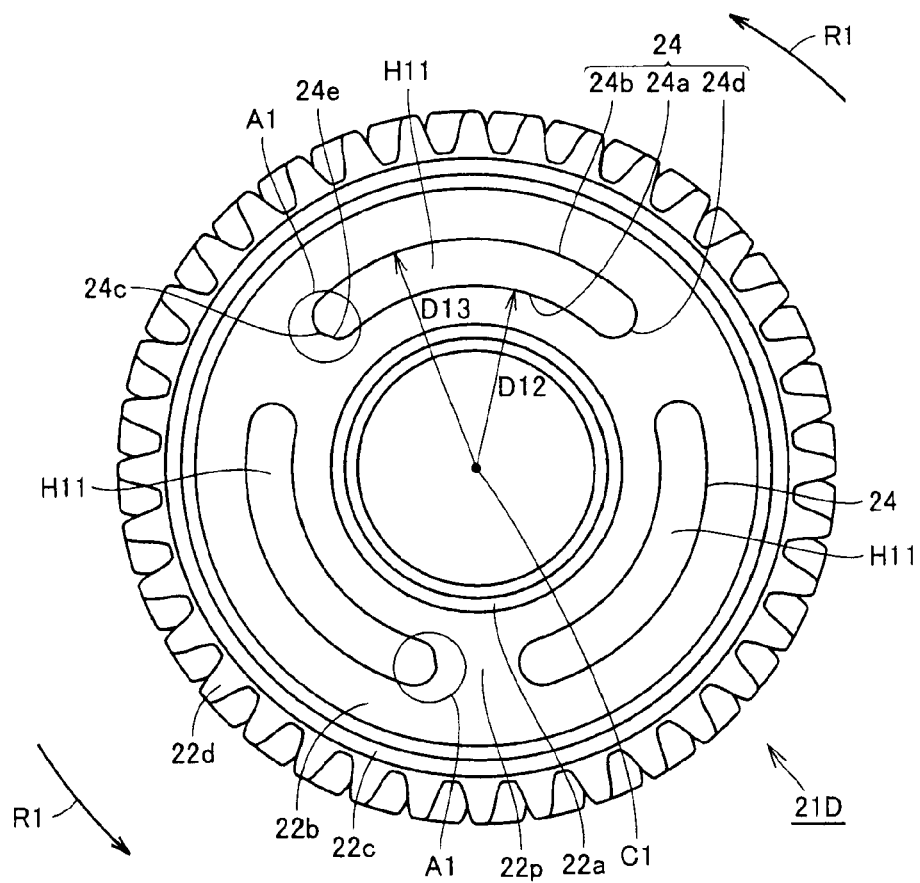
FIG. 15 is a front view of a helical gear according to still another embodiment.

Moreover, not all opening perimeter walls 24 have to employ first arc side face 24c or second arc side face 24d with a side face 24e, as a helical gear 21D shown in FIG. 15. For example, as compared to the example of FIG. 13, side face 24e may be provided at first arc side face 24c of two opening perimeter walls 24 selected among the three opening perimeter walls 24.

Figure 16:
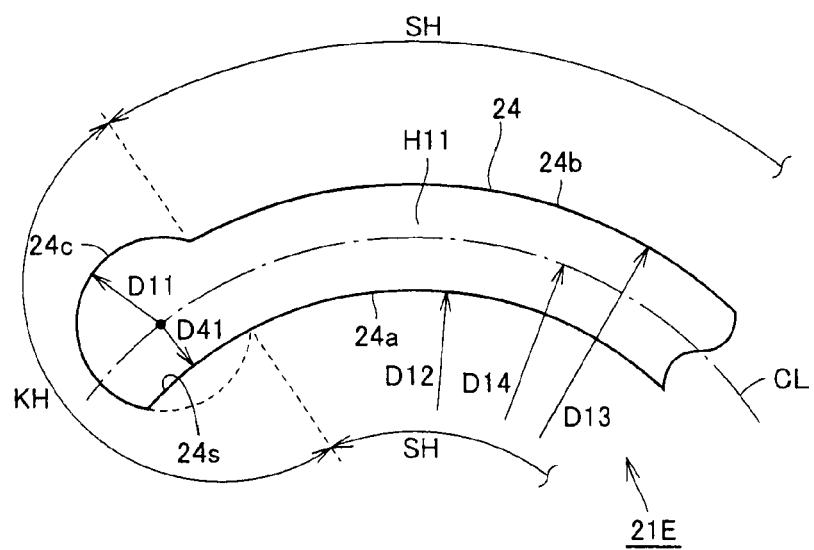
FIG. 16 is a front view of a helical gear according to still another embodiment.

A helical gear 21E employing an opening perimeter wall 24 according to another embodiment will be described with reference to FIG. 16. FIG. 16 is a front view of a helical gear according to another embodiment.

Opening perimeter wall 24 of helical gear 21E shown in FIG. 16 has a configuration basically similar to that of opening perimeter wall 24 shown in FIGS. 3-5. The difference lies in that the distance in the radial direction between inner peripheral side face 24a and outer peripheral side face 24b is set shorter than two times the length of first radius D11. Therefore, first arc side face 24c takes a shape more approximating a circle. First arc side face 24c protrudes in the radial direction from inner peripheral side face 24a and outer peripheral side face 24b.

Side face 24s provided at first arc side face 24c is a curved face having the same second radius D12 centered about the same rotation center C1 as inner peripheral side face 24a. Therefore, side face 24s and inner peripheral side face 24a constitute a continuous side face of the same side. Side face 24s has the distance D41 of the perpendicular line from arc center C2 to side face 24s set shorter than the length of first radius D11. The broken line in FIG. 16 virtually represents the side face of first arc side face 24c if side face 24s was not provided. The provision of side face 24s corresponds to the case where the region between side face 24s and the broken line is filled.

Figure 17:
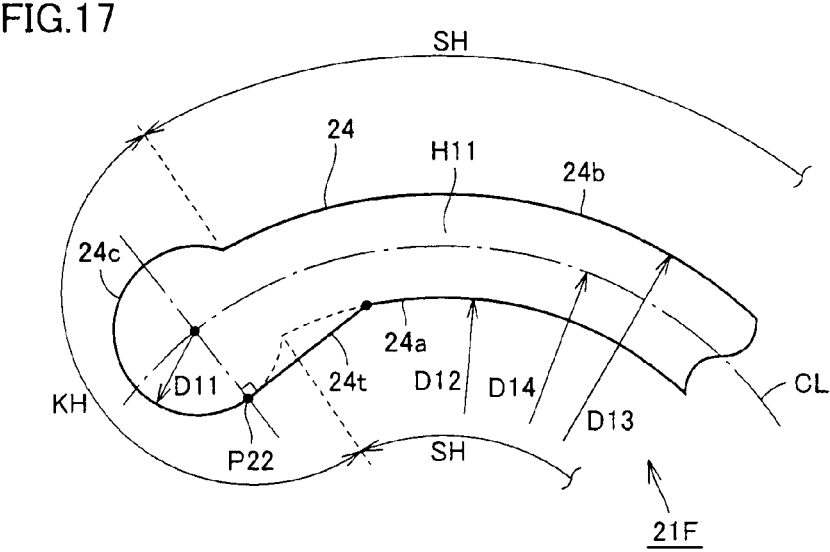
FIG. 17 is a front view of a helical gear according to still another embodiment.
Figure 18:
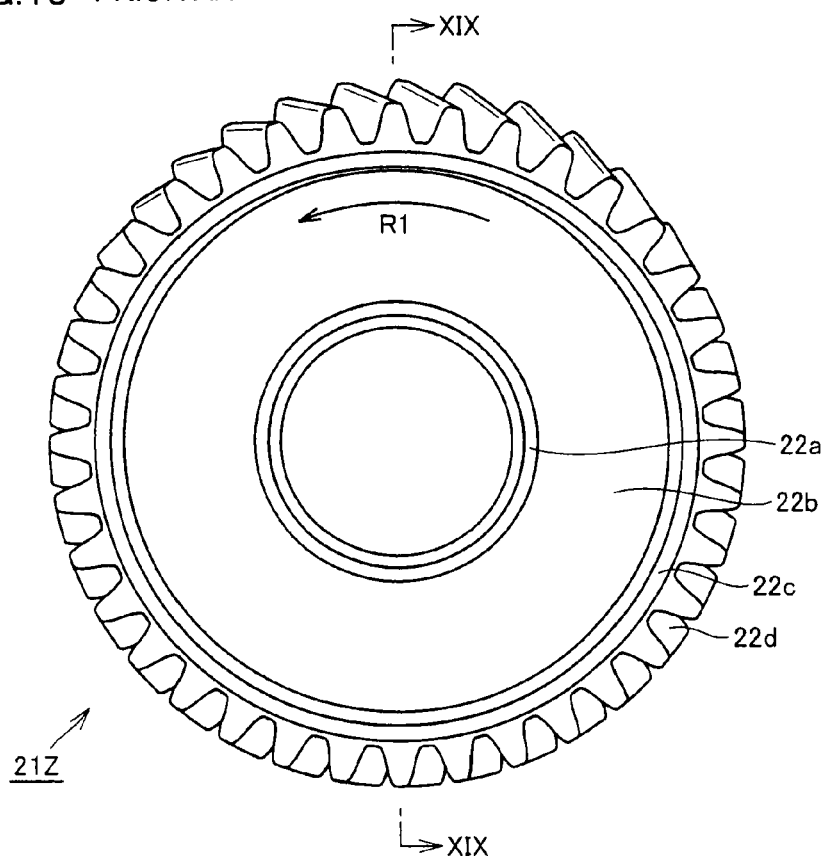
FIG. 18 is a front view representing deformation in the helical gear in a meshing state according to background art.

A helical gear 21F employing an opening perimeter wall 24 according to still another embodiment will be described with reference to FIG. 17. FIG. 17 is a front view of a helical gear according to still another embodiment.

The difference between opening perimeter wall 24 of helical gear 21F shown in FIG. 17 and opening perimeter wall 24 of helical gear 21E shown in FIG. 16 is that, at the rotation center C1 side of first arc side face 24c in opening perimeter wall 24 of helical gear 21F shown in FIG. 17, side face 24t corresponds to a tangent line of first arc side face 24c, and side face 24t is provided to meet inner peripheral side face 24a.

This results in a side face in which the distance D42 of the perpendicular line from arc center C2 to side face 24t is identical to the distance of first radius D11, but the distance from arc center C2 at the side face towards the inner peripheral side face 24a side differs from the length of first radius D11. The broken line in FIG. 17 virtually represents the side face of first arc side face 24c and inner peripheral side face 24a if side face 24s was not provided. The provision of side face 24t corresponds to the state where first arc side face 24c and inner peripheral side face 24a are partially removed.

Helical gear 21E shown in FIG. 16 and helical gear 21F shown in FIG. 17 may have an opening perimeter wall 24 that is provided in a symmetrical shape, or that is provided at only the leading end side in the direction of rotation, likewise with the helical gears set forth above. Furthermore, the configuration of FIGS. 16 and 17 may be employed at all opening perimeter walls 24 provided in the helical gear, or only in a selected opening perimeter wall 24.

Thus, helical gear 21E shown in FIG. 16 and the helical gear shown in FIG. 17 have the rigidity at disk 22b at the region where side faces 24s and 24t are provided improved, alleviating the concentration in stress for the purpose of reducing stress occurring in the proximity of first arc side face 24c when in a meshing state of the gear. As a result, the deformation of the teeth being urged against the region of higher rigidity can be alleviated, allowing increase of the root stress to be suppressed.

Thus, stress and noise can be suppressed, and the stress occurring at the leading end side in the direction of rotation of the through hole provided in the disk can be reduced. As a result, the performance of a gear device employing such a helical gear, as well as a transaxle including the gear device can be improved.

It should be understood that the embodiments and examples disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

The present invention is particularly suitable for a gear device such as in the transmission, transfer, and the like in a vehicle.

REFERENCE SIGNS LIST 10, 20, 30 rotation shaft; 11 first gear (helical gear); 21 second gear (helical gear); 22a hub; 22b disk; 22c rim; 22d teeth; 24 opening perimeter wall; 24a inner peripheral side face; 24b outer peripheral side face; 24c first arc side face; 24d second arc side face; 21A, 21B, 21C, 21D, 21E, 21F helical gear; 24 opening perimeter wall; 24e, 24s, 24t side face; 41, 42 meshing point; 81 final drive gear; 90 differential unit; 91 final driven gear; 100, 200 rotating electric machine; 300 planetary gear; 400 differential mechanism; C1 rotation center; C2 arc center; C2 virtual arcuate line CL; D11 first radius.

The invention claimed is:

1. A helical gear including a hub mounted on a rotation shaft and having a rotation center, a disk extending from said rotation center of said hub towards an outer side in a radial direction, and a rim provided at an outer side of said disk,
    said rim including a plurality of teeth at an outer peripheral face,
    said disk including a plurality of opening perimeter walls defining through holes provided along a perimeter of said hub,
    said opening perimeter wall including
    a first arc side face located at a leading end side in a direction of rotation, concave towards said leading end side in the direction of rotation, and having a distance from an arc center as a first radius, and
    said first arc side face including a side face at a side of said rotation center of said hub, located at a position with a distance from said arc center differing from a length of said first radius, on a verge of a virtual arcuate line centered about the rotation center of said hub and passing through said arc center.

2. The helical gear according to claim 1, wherein said opening perimeter wall includes
    an inner peripheral side face located at said hub side,
    an outer peripheral side face located at a side closer to said rim than said inner peripheral side face,
    said first arc side face joining one end of said inner peripheral side face and one end of said outer peripheral side face, a second arc side face joining the other end of said inner peripheral side face and the outer end of said outer peripheral side face, said inner peripheral side face constituting a portion of an arc having a second radius centered about said rotation center of said hub, said outer peripheral side face constituting a portion of an arc centered about said rotation center of said hub, and having a third radius larger than said second radius, the arc center of said first arc side face being located on a middle radius arcuate line that runs along a center spot between said inner peripheral side face and said outer peripheral side face.

3. The helical gear according to claim 2, wherein a distance of a perpendicular line from said arc center to said side face is shorter than a length of said first radius.

4. The helical gear according to claim 3, wherein the distance in the radial direction between said inner peripheral side face and said outer peripheral side face is set equal to two times the length of said first radius.

5. The helical gear according to claim 4, wherein said side face is provided to meet an intersection point of said first arc side face where said virtual arcuate line crosses.

6. The helical gear according to claim 4, wherein said side face is provided to extend up to said outer peripheral side face side, with said virtual arcuate line as a verge.

7. The helical gear according to claim 4, wherein said side face is provided to meet said inner peripheral side face.

8. The helical gear according to claim 3, wherein the distance in the radial direction between said inner peripheral side face and said outer peripheral side face is set shorter than two times the length of said first radius.

9. The helical gear according to claim 8, wherein said side face is a curved face having same said second radius centered about said rotation center identical to the rotation center of said inner peripheral side face.

10. The helical gear according to claim 2, wherein
a distance in the radial direction between said inner peripheral side face and said outer peripheral side face is set shorter than two times the length of said first radius, a distance of a perpendicular line from said arc center to said side face is identical to said first radius, and said side face is provided to meet said inner peripheral side face.

11. The helical gear according to claim 2, wherein said second arc side face is provided having a shape symmetric to said first arc side face with said inner peripheral side face and said outer peripheral side face therebetween.

12. The helical gear according to claim 1, wherein said opening perimeter wall includes
said first arc side face at said leading end side in the direction of rotation, and a second arc side face at a tail end side in the direction of rotation, said first arc side face and said second arc side face constituting a circular shape, said side face being provided to meet an intersection point of said first arc side face where said virtual arcuate line crosses.

13. The helical gear according to claim 12, wherein said second arc side face is provided having a shape symmetric to said first arc side face about a radial line passing through said rotation center and said arc center.

14. A power transmission apparatus including the helical gear defined in claim 1.

* * * * *